May 4, 1943.    L. M. TICHVINSKY    2,318,114
THRUST BEARING
Filed Oct. 26, 1940

WITNESSES:
C. J. Weller
F. P. Lyle

INVENTOR
Leonid M. Tichvinsky.
BY O. D. Buchanan
ATTORNEY

Patented May 4, 1943

2,318,114

UNITED STATES PATENT OFFICE 2,318,114

THRUST BEARING

Leonid M. Tichvinsky, Annapolis, Md., assignor to Westinghouse Electric & Manufacturing Company, East Pittsburgh, Pa., a corporation of Pennsylvania Application October 26, 1940, Serial No. 362,967

4 Claims. (Cl. 308—134.1)

The present invention relates in general to thrust bearings for supporting a rotating shaft against end thrust, and it relates more particularly to a thrust bearing which is adapted to be lubricated by a liquid in which the bearing and shaft are immersed, although the principle of the invention may also be applied to other types of bearings.

There are many cases in which motor driven equipment, such as pumps, is operated immersed in a liquid, and in such cases it is often desirable to use the liquid itself as a lubricant for the bearings if it has suitable characteristics, since this greatly simplifies the problem of lubrication. In the case of thust bearings, this can be done by providing helical grooves or equivalent means on the shaft for feeding the liquid to the inner periphery of the radial thrust bearing surfaces and thus providing an adequate and continuous supply of lubricant to the bearing. When the shaft rotates at relatively high speeds, however, difficulty is encountered with such an arrangement because of turbulence and eddies in the liquid flowing through the grooves on the shaft, which results in an uneven or pulsating flow of lubricant to the bearing and unsatisfactory lubrication.

The principal object of the present invention is to provide a thrust bearing for supporting a rotatable shaft against end thrust which is particularly intended for operation immersed in a liquid and which is adequately lubricated by the liquid in which it is immersed at any speed of rotation of the shaft.

A more specific object of the invention is to provide a thrust bearing for operation immersed in a liquid in which the liquid is supplied to the bearing by helical grooves on the shaft which it supports and which is so designed that the flow of liquid to the bearing is steady and uniform, even when the shaft rotates at relatively high speeds, so that adequate and effective lubrication is obtained.

Further objects and advantages of the invention will be apparent from the following detailed description, taken in connection with the accompanying drawing, in which.

Figure 1:
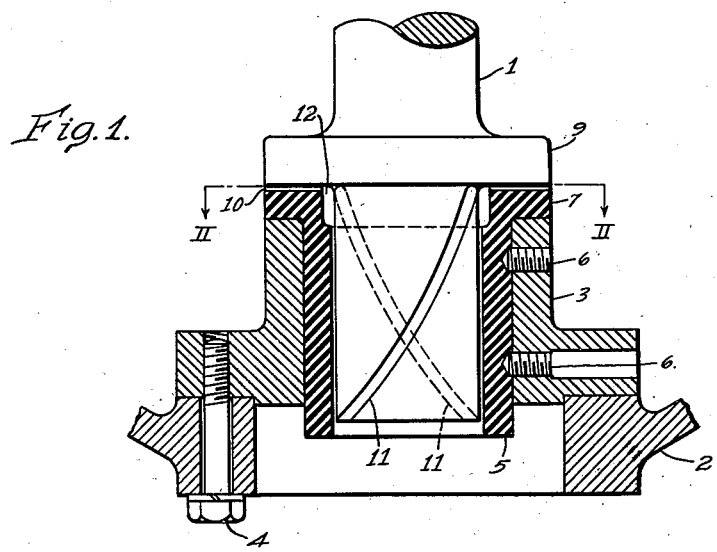
Figure 1 is a vertical, sectional view through a thrust bearing embodying the invention.
Figure 2:
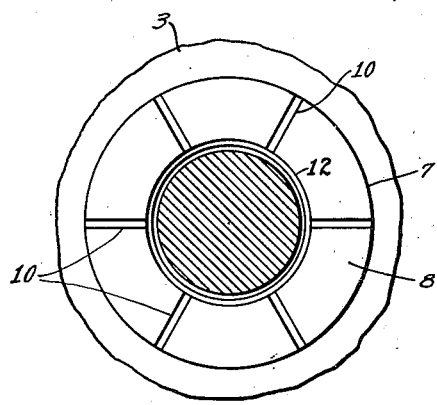
Fig. 2 is a transverse, sectional view approximately on the line II—II of Fig. 1.

The bearing shown in the drawing is designed particularly for use in a combined motor and pump unit which is to be used for pumping gasoline or oil from a tanker, the unit being lowered into the hold of the tanker for this purpose, and operating submerged in the gasoline or oil. It will be obvious, however, that this bearing may also be used for numerous other types of equipment intended to operate submerged in a liquid which has suitable characteristics to permit its use as a lubricant for the bearing.

As shown in Fig. 1, the bearing is used to support the shaft 1 against end thrust in a vertical direction. The bearing may be supported by a bracket member 2 which preferably forms part of the housing or frame of the pump or other equipment driven by the shaft 1, and which has not been illustrated in the drawing since it forms no part of the invention. The bearing is supported in a generally cylindrical cartridge 3 which is mounted on the bracket 2 by means of bolts 4. A guide bearing 5 is secured in the cartridge 3 by means of setscrews 6 and closely encircles the shaft 1 to maintain it in alignment. The guide bearing 5 may be made of any desired bearing material, either metallic or non-metallic, and may preferably be made of a suitable non-metallic material such as Micarta. The guide bearing 5 has a flange 7 at its upper end which provides a generally radial bearing surface 8 cooperating with an opposed radial bearing surface on a thrust collar 9 formed on the shaft 1. The bearing surface 8 of the flange 7 has a plurality of generally radial slots 10 formed in it through which lubricant may flow between the opposed bearing surfaces.

As explained above, this bearing is particularly intended to be operated submerged in a liquid which may be used as a lubricant for the bearing. In order to provide an adequate supply of this liquid to the bearing, it must be fed to the inner ends of the slots 10 so that it will flow outward through them and from the slots into the clearance between the bearing surfaces. The supply of lubricant to the inner ends of the slots may conveniently be accomplished by providing one or more helical grooves 11 on the periphery of the shaft 1. When the shaft is rotated, the liquid in which it is immersed will flow upward through the grooves 11 and thence to the inner ends of the slots 10 through which it will flow to lubricate the bearing. It has been found, however, that with this arrangement, when the shaft is rotated at relatively high speeds, such as 1700 or 1800 R. P. M., the liquid flowing through the grooves 11 becomes turbulent at the upper ends of the grooves, and eddies form in it so that the flow of liquid to the slots 10 is uneven and pulsating, resulting in unsatisfactory lubrication. In order to eliminate this effect and improve the performance of the bearing, the upper end of the guide bearing 5 is relieved adjacent the inner ends of the slots 10 by cutting an annular recess 12 in its inner periphery, thus forming an annular chamber around the shaft at the inner ends of the slots 10. The liquid flowing through the grooves 11 is discharged into this chamber and flows from the chamber into the slots 10. The annular chamber 12 thus acts as a pressure chamber between the grooves 11 and slots 10 and its effect is to suppress the turbulence and eddies in the liquid flowing through the helical grooves so that the flow of liquid to the slots 10 is steady and uniform. In this way, adequate and effective lubrication is obtained by using the liquid in which the bearing and shaft operate.

Figure 3:
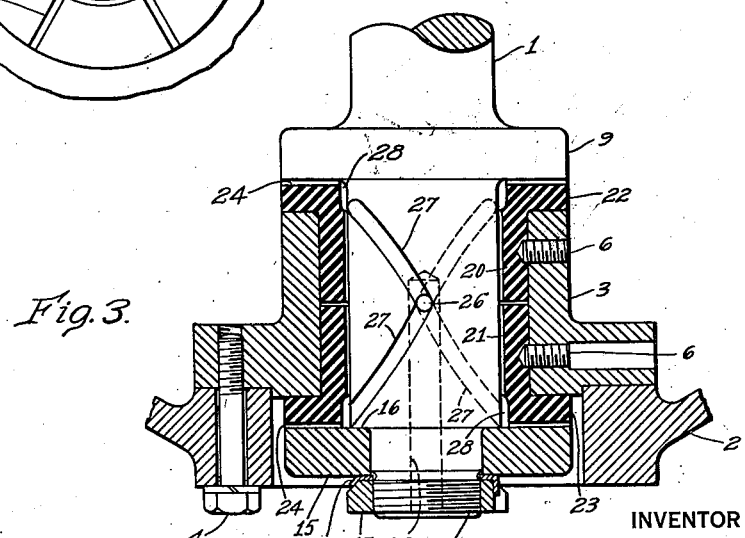
Fig. 3 is a vertical, sectional view similar to Fig. 1, showing another embodiment of the invention.

Fig. 3 shows the application of the invention to a case in which it is desired to support the shaft against end thrust in both directions. The general arrangement of this bearing is the same as that of the bearing of Fig. 1, and corresponding parts are designated by the same reference numerals. In this case, end thrust in a vertical upward direction is taken by a second thrust collar 15 which is clamped against a shoulder 16 at the lower end of the shaft by means of a nut 17 and lock washer 18 threaded on a reduced portion 19 of the shaft 1. The guide bearing is made in two sections 20 and 21 to facilitate assembly of the bearing, and these sections have flanges 22 and 23, respectively, providing radial bearing surfaces for cooperation with the opposed radial bearing surfaces of the thrust collars 9 and 15. As before, the radial bearing surfaces of the flanges 22 and 23 have a plurality of generally radial slots 24 formed in them through which the lubricating liquid flows to the bearing surfaces.

In this embodiment of the invention, the liquid which serves as a lubricant is supplied to the slots 24 through an axial passage 25 bored in the shaft. A transverse passage 26 is drilled through the shaft at the upper end of the axial passage 25 to permit the liquid to flow outward to the surface of the shaft, and helical grooves 27 are provided on the periphery of the shaft which communicate with the ends of the passage 26 to feed the liquid to the slots 24. Since the transverse passage 26 extends radially of the shaft, the centrifugal force acting on the liquid in the passage tends to maintain a steady flow of liquid outwardly from the axial passage 25, and thus, in effect, a pumping action is provided which insures a continuous flow of liquid and which tends to provide a uniform and steady flow through the grooves 27. As before, the guide bearings 20 and 21 are relieved at their inner peripheries adjacent the ends of the slots 24 to form annular recesses 28. As explained above, the recesses 28 act as pressure chambers between the grooves 27 and slots 24 and provide a steady and uniform flow of liquid to the slots 24, even when the shaft is rotated at relatively high speeds, so that satisfactory lubrication of the thrust bearing surfaces is obtained by the liquid in which the bearing is immersed.

It should now be apparent that a thrust bearing construction has been provided which makes it possible to use a liquid in which the bearing and the shaft which it supports are immersed as a lubricant for the bearing, and that the bearing is so designed that a steady and uniform flow of lubricant to the bearing surfaces is provided even when the shaft is rotated at relatively high speeds. This result is obtained, as explained above, by the use of a pressure chamber surrounding the shaft into which the liquid is fed by helical grooves or equivalent means on the shaft and from which it flows into the radial slots which supply it to the bearing surfaces. It will be understood that although the invention has been described with particular reference to a bearing which operates submerged in a liquid and which is lubricated by such liquid, the principle of the invention may be applied to bearings in which other types of lubricant supply are used by providing a pressure chamber between the lubricant supply and the slots in the bearing surfaces in order to reduce or substantially eliminate turbulence and eddies in the lubricant, and thus attain a uniform flow of lubricant.

It is to be understood, therefore, that although a specific embodiment of the invention has been illustrated and described, it is not limited to the particular constructional form selected for purposes of illustration, but in its broadest aspects, it includes all equivalent modifications and embodiments which come within the scope of the appended claims.

I claim as my invention:

1. A thrust bearing for a rotatable shaft comprising a thrust collar on the shaft for taking end thrust in one direction, a second thrust collar for taking end thrust in the other direction, a guide bearing encircling the shaft between said thrust collars, said guide bearing having a radial flange at each end providing radial bearing surfaces opposing the radial surfaces of said thrust collars, each of said flanges having a plurality of generally radial slots in its radial bearing surface and an annular recess about its inner periphery into which the slots open, said shaft having an axial passage therethrough for the supply of lubricant and helical grooves for supplying lubricant to the chambers formed by said recesses, said grooves communicating with said axial passage.

2. A thrust bearing for a rotatable shaft comprising a thrust collar on the shaft for taking end thrust in one direction, a second thrust collar for taking end thrust in the other direction, a guide bearing encircling the shaft between said thrust collars, said guide bearing having a radial flange at each end providing radial bearing surfaces opposing the radial surfaces of said thrust collars, each of said flanges having a plurality of generally radial slots in its radial bearing surface and an annular recess about its inner periphery into which the slots open, said shaft having an axial passage therethrough for the supply of lubricant to the bearing and having helical grooves in its surface terminating within said recesses, and said shaft also having radial passages extending from said axial passage to said helical grooves for feeding lubricant continuously to said grooves.

3. A combined thrust and guide bearing for a rotatable shaft comprising a thrust collar on the shaft, said thrust collar having a radial bearing surface, a stationary guide bearing member encircling the shaft adjacent the thrust collar, said guide bearing member having a radial flange at its end providing a radial bearing surface opposing the bearing surface of the thrust collar, said flange having a plurality of generally radial slots in its radial bearing surface and having an annular recess about its inner periphery, said radial slots opening into said recess at their inner ends, and means on the surface of the shaft for continuously feeding lubricant to said annular recess.

4. A combined thrust and guide bearing for a rotatable shaft comprising a thrust collar on the shaft, said thrust collar having a radial bearing surface, a stationary guide bearing member encircling the shaft adjacent the thrust collar, said guide bearing member having a radial flange at its end providing a radial bearing surface opposing the bearing surface of the thrust collar, said flange having a plurality of generally radial slots in its radial bearing surface and having an annular recess about its inner periphery, said radial slots opening into said recess at their inner ends, said shaft having a helical groove in its surface terminating within said recess for feeding lubricant to the recess, and said shaft also having an axial passage therethrough and a radial passage connecting the axial passage to the helical groove for continuously supplying lubricant thereto.

LEONID M. TICHVINSKY.